(12) United States Patent
Beck et al.

(10) Patent No.: US 8,794,845 B2
(45) Date of Patent: Aug. 5, 2014

(54) BEARING CAGE SEGMENT, BEARING CAGE AND METHOD FOR MANUFACTURING THE SAME

(75) Inventors: Burkard Beck, Unterpleichfeld (DE); Berthold Beyfuss, Kaisten (DE); Hans-Juergen Friedrich, Königsberg-Römershofen (DE); Alfred Radina, Poppenlauer (DE); Jonas Schierling, Haßfurt (DE); Werner Schneider, Stadtlauringen (DE); Gerhard Wagner, Prichsensfadt (DE); Juergen Weiglein, Oerlenbach (DE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/561,287

(22) Filed: Jul. 30, 2012

(65) Prior Publication Data
US 2013/0188900 A1 Jul. 25, 2013

(30) Foreign Application Priority Data
Aug. 1, 2011 (DE) .......................... 10 2011 080 167

(51) Int. Cl.
*F16C 33/54* (2006.01)
*F16C 33/46* (2006.01)
(52) U.S. Cl.
USPC .......................................... 384/573; 384/578
(58) Field of Classification Search
USPC .................. 384/523, 525, 572, 573, 578, 579
See application file for complete search history.

(56) References Cited

U.S. PATENT DOCUMENTS

| | | | | |
|---|---|---|---|---|
| 1,013,518 A | * | 1/1912 | Schilling | 384/526 |
| 2,946,633 A | | 7/1960 | Gothberg | |
| 4,436,349 A | * | 3/1984 | Hallerback | 384/572 |
| 5,082,375 A | * | 1/1992 | Hillmann | 384/526 |
| 6,666,585 B1 | * | 12/2003 | Kotzalas et al. | 384/578 |
| 2006/0115193 A1 | | 6/2006 | Begin | |

FOREIGN PATENT DOCUMENTS

| | | |
|---|---|---|
| DE | 6945329 U | 3/1970 |
| DE | 6918881 U | 7/1970 |
| DE | 2602265 A1 | 7/1976 |
| DE | 3635261 A1 | 7/1987 |
| DE | 3627153 C1 | 12/1987 |
| DE | 8621532 U1 | 12/1987 |
| DE | 4027109 A1 | 3/1992 |

(Continued)

OTHER PUBLICATIONS

Translation of DE3627153 obtained Oct. 18, 2013.*

*Primary Examiner* — James Pilkington
(74) *Attorney, Agent, or Firm* — Bryan Peckjian; SKF USA Inc. Patent Department (57) ABSTRACT

A bearing cage for a rolling element bearing includes a plurality of individual bearing cage segments configured to respectively accommodate rolling elements in rolling element pockets formed by the bearing cage segments. Each bearing cage segment includes a first coupling device disposed on a first axial end thereof. A first lamellar support ring defines first and second ring halves that are connected to each other, are axially adjacent to each other are biased towards each other. The first ring half extends through the respective first coupling devices of the plurality of bearing cage segments and the second ring half is disposed on an axially-inner side or an axially-outer side of the first coupling devices such that the first coupling devices are clamped between the first and second ring halves.

18 Claims, 3 Drawing Sheets

(56) References Cited

FOREIGN PATENT DOCUMENTS

| DE | 19736374 A1 | 2/1999 |
| DE | 102006045436 A1 | 3/2008 |
| DE | 102007002359 A1 | 7/2008 |
| DE | 102007049119 A1 | 4/2009 |
| JP | 2011132983 A | 7/2011 |
| WO | WO2011031931 A1 | 3/2011 |
| WO | WO2012110601 A2 | 8/2012 |

* cited by examiner

BEARING CAGE SEGMENT, BEARING CAGE AND METHOD FOR MANUFACTURING THE SAME

CROSS-REFERENCE

This application claims priority to German patent application no. 10 2011 080 167.7 filed on Aug. 1, 2011, the contents of which are fully incorporated herein by reference.

TECHNICAL FIELD

The present invention relates to a bearing cage segment for rolling-element bearings, a bearing cage formed from support rings and such bearing cage segments, as well as a method for manufacturing such a bearing cage.

BACKGROUND

Bearing cages for rolling-element bearings are generally comprised of two axially-spaced-apart side rings and a plurality of bridges connecting the side rings. The bridges are disposed one behind the other in the circumferential direction of the bearing cage and each pair of adjacent bridges forms a pocket for accommodating or retaining a rolling element. The pockets of the bearing cage respectively hold the rolling elements at defined intervals relative to each other and prevent direct contact between neighboring rolling elements, thereby reducing friction and thus heat generation in the bearing. The pockets also ensure a uniform distribution of the rolling elements around the entire circumference of the cage or rolling-element bearing and thus enable a uniform load distribution as well as a quiet and smooth running of the bearing.

Bearing cages are heavily stressed during operation by frictional, strain, and inertial forces. In addition, under certain circumstances, detrimental chemical effects (degradation or corrosion) can be caused by certain additives and substances. Design and material selection are therefore of critical importance for the operational reliability of the cage as well as for the operational efficiency of the bearing.

Rolling-element bearing cages typically comprise pressed cages or solid cages. Pressed cages for rolling-element bearings are usually manufactured from sheet steel, in some cases also from sheet brass. Solid cages for rolling-element bearings can be manufactured for example from brass, steel, aluminum, polymers, or phenolic resin.

Solid polymer cages are often manufactured using an injection molding process and are characterized by a favorable combination of strength and elasticity. Good sliding properties of polymer on lubricated steel surfaces and the smoothness of the cage surfaces in contact with the rolling elements lead to low cage friction, a correspondingly low heat generation in the bearing and barely measurable wear. The forces from the inertia of the cage also remain small due to the low material density. The excellent running properties of polymer cages even under lubricant starvation conditions permit continued operation of the bearing for some time without risk of seizure and secondary damage.

For example, polyamide 66, polyamide 46, polyetheretherketone (PEEK), phenolic resin or other polymer materials can be used as polymers for conventional injection-molded bearing cages.

With pure polymer cages, however, it is very difficult to manufacture cages for medium to large bearing diameters, for example a diameter of greater than approximately 300 mm, with the required quality. This is due, inter alia, to the thermal expansion coefficient of the polymer, which is substantially greater than steel. As a result, when heat is generated during operation, a clamping effect of the rolling elements in a polymer cage can result due to the expansion of the polymer. Further, due to the higher thermal expansion coefficient, shoulder guidance of a polymer cage cannot be ensured and the dimensional stability in relation to the bearing cage diameter is also worsened. Moreover, the strength of the polymer is significantly limited in the radial direction as compared to metal. Finally, complex and large injection molding tools/machines also are required to manufacture polymer cages having such large diameters, which in turn leads to unacceptably high manufacturing costs.

SUMMARY

Accordingly, it is one object of the present teachings to disclose a bearing cage design that can be advantageously used, e.g., in medium to large bearing diameters, e.g., greater than about 300 mm. The present bearing cages preferably exhibit a favorable combination of strength, elasticity and sliding properties, which is normally typical only for smaller polymer cages.

According to one aspect of the present teachings, a combined (or composite) bearing cage is comprised of a combination of bearing cage segments and at least one support ring. The bearing cage segments are placed or disposed (mounted) along the circumference of the at least one support ring in the circumferential direction thereof. Preferably, bearing cage segments comprised of polymer and support rings comprised of metal and/or carbon may be used. For a captive or interlocked arrangement of the bearing cage segments on the support ring, the support ring is formed as a lamellar ring, such that at least one winding of the ring can be threaded, so to speak, through the respective individual bearing cage segments. In this case, a plurality of bearing cage segments can be combined to form a ring body around at least one support ring that is formed as a lamellar ring.

In the present specification, the term "lamellar ring" is intended to encompass, e.g., an elastically-resilient, spiral-shaped lamellar ring, which is formed, in principle, from two axially-adjacently-disposed and axially- or radially-biased (pretensioned) ring halves connected at one end thereof. A "double-wound lamellar ring" is therefore understood to encompass a design having two axially-abutting ring halves having end sides axially and/or radially biased or urged towards each other. The two ring halves are manufactured from a single continuous band of (metal or carbon) material, i.e. the two ring halves preferably extend continuously (in a spiral manner) from one to the other without a seam therebetween. The lamellar ring thus has, in effect, the shape of a coil with flat sides that abut each other in the axial direction due to the axial biasing (pretension) force inherent thereto.

According to one aspect of the present teachings, a bearing cage segment is provided for a rolling-element bearing cage. The bearing cage segment includes two circumferential bridges extending in a circumferential direction and at least one connecting bridge connecting the circumferential bridges in an axial direction of the bearing cage (i.e. parallel to the rotational axis of the bearing). The bearing cage segment also includes at least one coupling device configured to captively or interlockingly hold the bearing cage segment on at least one support ring (lamellar ring) or vice versa, such that at least one pocket for accommodating a rolling-element bearing can be formed by two bearing cage segments that are disposed adjacent to one another in the circumferential direction of the support ring.

According to preferred exemplary embodiments, the bearing cage segment(s) can be formed from a polymer, such as for example polyamide 66, polyamide 46, polyetheretherketone (PEEK), phenolic resin or also another polymer material.

In some exemplary embodiments, the bearing cage segment(s) can have only one connecting bridge connecting the two circumferential bridges, so that one pocket for accommodating a rolling-element bearing is formed by two bearing cage segments disposed adjacent to one another in the circumferential direction of the support ring. Other exemplary embodiments of bearing cage segments can also have two connecting bridges connecting the two axially-opposing circumferential bridges, so that a rolling-element pocket is formed by the combination of the two connecting bridges and two circumferential bridges of each bearing cage segment. In this case, two rolling-element bearing pockets are formed by two bearing cage segments disposed adjacent to one another in the circumferential direction on the support ring.

According to an exemplary embodiment, the coupling device can comprise a receptacle formed on or in at least one of the circumferential bridges for the interference-fit reception (accommodation) of the at least one support ring formed as a lamellar ring. In such an embodiment, the bearing cage segment can be designed such that a connecting bridge that connects the two circumferential bridges extends in the axial direction, in order to hold the two circumferential bridges at a predefined axial distance relative to one another.

Although, in principle, embodiments are also conceivable wherein only one lamellar-ring support ring suffices to support the bearing cage segments, in preferred exemplary embodiments the coupling device has a receptacle formed in or on each of its two axially-spaced-apart circumferential bridges. Each receptacle is configured to accommodate or retain one support ring (lamellar ring) in an interference-fit or interlocking manner. In such an exemplary embodiment, each bearing cage segment can therefore be captively or interlockingly coupled in an interference-fit manner with two axially-spaced-apart lamellar rings using the receptacles formed on or in the respective circumferential bridges.

Each coupling device can therefore be designed such that the receptacles formed on or in the circumferential bridges of the bearing cage segments are embodied as circumferentially-oriented (curved) openings or conduits for a support ring (lamellar ring). Such conduits in the circumferential bridges can for example be designed so that their (e.g., radial) cross-section matches, or at least substantially matches, the (e.g., radial) cross-section of the lamellar ring. In this case, each bearing cage segment provides a highly loadable clamping seat that can be clamped onto the at least one support ring (lamellar ring).

For this purpose, the dimensions of the cross-section (e.g., in the radial direction) of an (elastic) conduit according to certain exemplary embodiments can be 97% to 99% of the dimensions of the cross section (e.g., in the radial direction) of the lamellar ring to be held in the conduit. In the present specification, the term "elastic conduit" is understood to encompass, for example, a polymer conduit whose opening dimensions adapt (conform, match, etc., e.g., by stretching or expanding) to the dimensions of the lamellar ring upon its introduction, so that a sufficiently tight fit of the lamellar ring in the conduit is ensured. According to other exemplary embodiments however, the dimensions of the cross-section (e.g., in the radial direction) of the conduit can be 100% or more of the dimensions of the cross-section (e.g., in the radial direction) of the lamellar ring to be held by the conduit, so that an especially smooth (e.g., reduced friction) threading of the lamellar ring into the conduit(s) is ensured.

The receptacles or conduits for the at least one support ring (lamellar ring) can, according to one embodiment, be formed in the side of a first circumferential ring that is disposed opposite of (facing) a second circumferential ring. In other words, the support ring conduits formed in the circumferential rings lie on sides of the opposing circumferential rings that axially face towards each other, so that a support ring does not lie on an end face of a thus-formed bearing cage, but rather lies closer to an outer or inner ring surface. This allows the bearing ring to sit closer to the rolling elements, for example rollers, and is thus more dimensionally stable. As a result, tilting moments are generated less frequently. Furthermore, space can be saved in the axial direction, which in turn can lead to bearings that are thinner overall.

Other embodiments also of course allow that the receptacles for the at least one support ring (lamellar ring) are formed on the side of a first circumferential bridge that is directed away from a second circumferential bridge. In other words, the support ring conduits can be formed on or in the circumferential rings on the sides of the circumferential bridges that axially face away each other, so that the support ring lies on an axial end face of a thus-formed bearing cage.

According to another aspect of the present teachings, a bearing cage is also provided for a rolling element bearing. The bearing cage is formed from a plurality of bearing cage segments disposed on at least one lamellar support ring. A bearing cage of this type preferably comprises a first support ring and a second support ring, each formed as lamellar rings, as well as a plurality of the above-mentioned bearing cage segments, which are combined to form a ring body around the two lamellar support rings using the above-described coupling devices.

According to other exemplary embodiments, a bearing cage for a rolling-element bearing includes a plurality of bearing cage segments for respectively accommodating rolling elements in rolling element pockets formed by the bearing cage segments. Each of the bearing cage segments has a coupling device configured to engage or interlock the bearing cage segment on or with at least one support ring (lamellar ring), such that the bearing cage segments can be mounted on (attached to) the at least one support ring using the coupling devices, whereby at least one rolling element pocket is formed by each two bearing cage segments that are adjacently disposed on the support ring.

The at least one support ring or lamellar ring (lamellar support ring) is advantageously formed from metal or carbon (e.g., carbon fiber composite) so that, after assembly of the bearing cage, a combined metal-polymer or carbon-polymer bearing cage results.

According to some exemplary embodiments of the present teachings, the lamellar ring(s) can be sealed (fused or bonded) after the mounting of the bearing cage segments, in order to hold or retain the bearing cage segments in an especially captive manner. Such a sealing (fusing or bonding) could be achieved for example through welding, soldering, etc. of the adjacent ring halves. For example, point welding or soldering (e.g. at the joints) may be performed, so that the ring halves, which are pretensioned (biased) against (towards) each other, can no longer be stretched, spaced or pulled apart.

By using a segmented construction achieved by the bearing cage segments and the lamellar support ring made of metal or carbon, the thermal expansion coefficient of the combined metal- or carbon-polymer bearing cages can be minimized, which is particularly beneficial for medium to large bearing diameters, i.e. greater than approximately 300 mm. As compared to pure polymer cages, an increase in strength, especially in the radial direction, can be achieved through the use of lamellar rings, e.g., made of steel. By using lamellar rings that function as support rings, there is effectively no upper limit for the ring diameter size.

Furthermore, polymer bearing cage segments can be coupled with metallic bearing support rings in such a way that, in the assembled state of the combined bearing cage, there is no metallic contact between rolling elements and metallic lamellar support rings, thereby significantly reducing wear that could be caused by cage/roller contact. The above-described dry-running properties of the combined metal- or carbon-polymer bearing cage can also be improved in an advantageous way, as compared to pure metal cages, through the use of polymer bearing cage segments.

Due to the elasticity of the polymer bearing cage segments, rolling elements can snap-fit in the respective pockets formed by adjacent segments, thereby retaining the rolling elements. A combined bearing cage according to this aspect of the present teachings can thus be assembled completely separate from the bearing.

Further advantages of exemplary embodiments of the present teachings can result from the sometimes substantial weight savings as compared to conventional brass or steel solid cages. This weight savings is achieved primarily through the use of polymer bearing cage segments according to the invention. Moreover, since relatively-small, individual polymer cage segments can be manufactured, instead of an entire (very large diameter) cage, it is possible to manufacture the cage segments using relatively simple and small injection molding tools, which in turn makes possible a cost-effective production of the combined bearing cage. Among other advantages, low running noise due to good dampening, excellent tribological properties and excellent dry-running properties are further advantages of the bearing cages according to this aspect of the present teachings.

Bearing cages having a plurality of polymer cage segments, which are combined around at least one lamellar ring to form a ring body, can in principle be used for all types and variants of bearings. Such a bearing cage can be constructed as outer ring guided, inner ring guided, and also raceway guided.

Bearing cages of the present teachings can be used, for example, in applications in which it is not possible to use brass material, such as e.g., in so-called acid gas applications ("sour gas" applications) or ammonia-compatible compressors (ammonia compressors). In the present bearing cages, standard components can be used for the lamellar rings and rolling elements.

Further objects, embodiments, advantages and designs of the present teachings will be explained in the following, or will become apparent, with the assistance of the exemplary embodiments and the appended Figures.

DETAILED DESCRIPTION OF THE INVENTION

Figure 1:
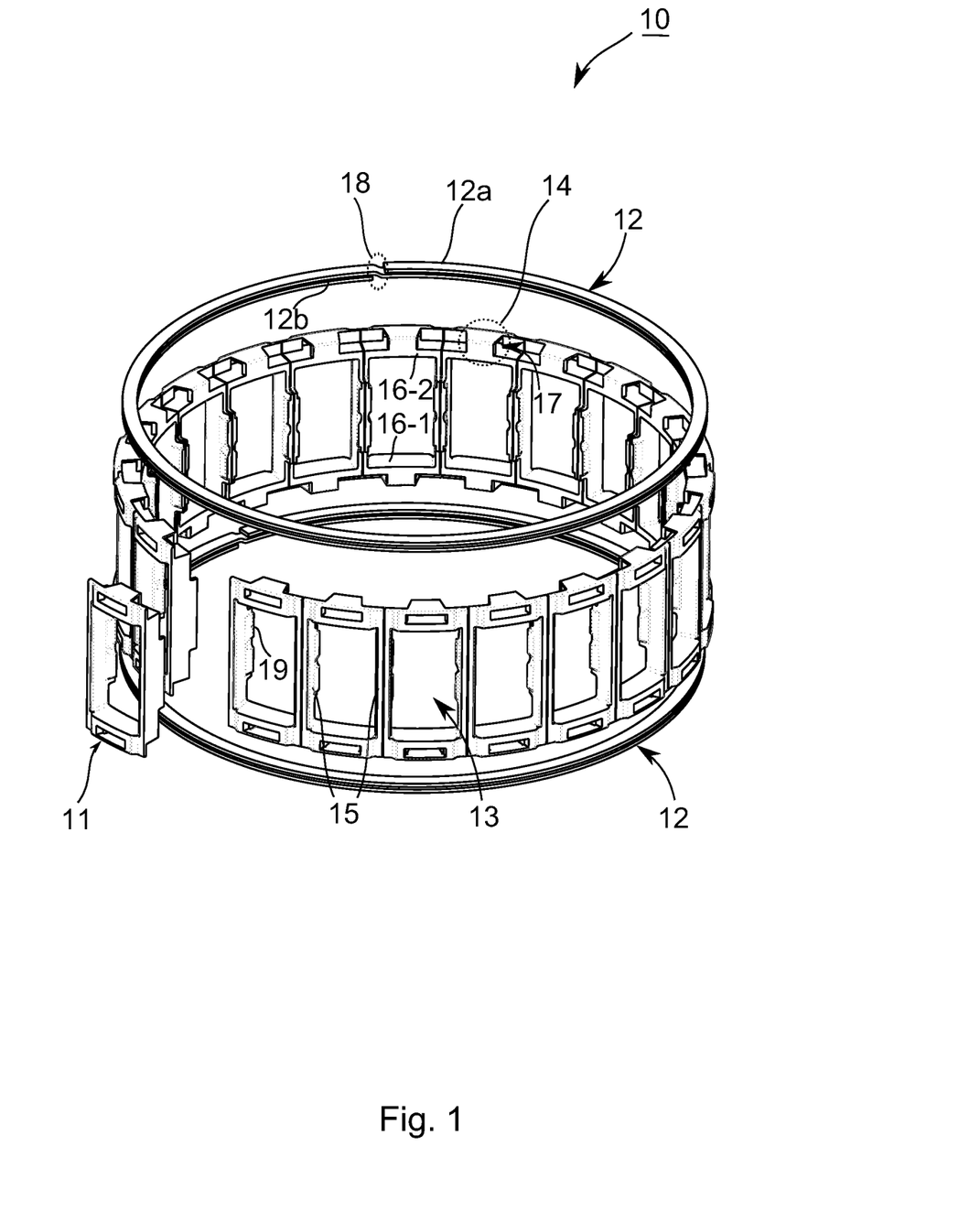
FIG. 1 shows a perspective view of a not-fully-assembled bearing cage having a plurality of separate cage segments, which can be mounted on two lamellar support rings, according to an exemplary embodiment.

FIG. 1 shows a perspective and merely exemplary illustration of a not-yet-fully-assembled bearing cage 10 having a plurality of separate cage segments 11, which can be mounted on or attached to two axially-spaced-apart lamellar support rings 12.

The plurality of bearing cage segments 11 serve to accommodate (not-shown) rolling elements in rolling element pockets 13 formed by the bearing cage segments 11. For this purpose, each bearing cage segment 11 comprises at least two axially-spaced-apart circumferential bridges 16-1, 16-2 extending in the circumferential direction of the bearing cage 10. Further, at least one connecting bridge 15 connects the circumferential bridges 16-1, 16-2 in each bearing cage segment 11 so that at least one pocket 13 or a opening for accommodating a rolling element can be formed by two bearing cage segments 11 that are adjacently disposed in the circumferential direction of the support ring 12. Although only one connecting bridge 15 would suffice per bearing cage segment 11, which connecting bridge 15 extends in the axial direction of the lamellar support ring 12 in an assembled state, i.e. in the direction of the rotational axis of the bearing, FIG. 1 shows an embodiment with two axially-extending bridges 15 spaced apart in the circumferential direction. The bridges 15 connect the opposing circumferential bridges 16-1, 16-2.

Each bridge 15 connects two axially-opposing circumferential bridges 16-1, 16-2 and extends in the axial direction, in order to hold the two circumferential bridges 16-1, 16-2 relative to one another at a predefined axial spacing, which depends for example on the roller length. In the exemplary embodiment shown in FIG. 1, each rolling element pocket 13 is formed and delimited by the two circumferential bridges 16-1, 16-2 and the two connecting bridges 15 of one cage segment 11. On the other hand, if only one connecting bridge 15 is provided per bearing cage segment 11, a rolling element pocket 13 is formed by two bearing cage segments 11 that are disposed adjacently on a lamellar support ring 12, wherein the pocket 13 or the opening is delimited by the circumferential bridges and the adjacent connecting bridges 15 of the bearing cage segments 11. In certain exemplary embodiments, in the assembled state of the bearing cage 10, end faces of the circumferential bridges 16-1, 16-2 form or provide guide flanges disposed so as to face towards the rolling elements.

According to preferred embodiments, each bearing cage segment 11 can be manufactured from a polymer material completely or entirely in one piece (i.e. without a seam), for example using an injection molding process. As was already mentioned above, the polymer material may be or may comprise, for example, polyamide 66, polyamide 46, polyetheretherketone (PEEK), phenolic resin or also other suitable polymer materials.

Each of the bearing cage segments 11 includes a coupling device 14 configured to hold or retain the support (lamellar) ring 12 on the bearing cage segment 11. In the illustrated exemplary embodiment, the bearing cage 10 includes two support rings 12 formed as lamellar rings, which each can be coupled with the individual bearing cage segments 11.

Figure 2:
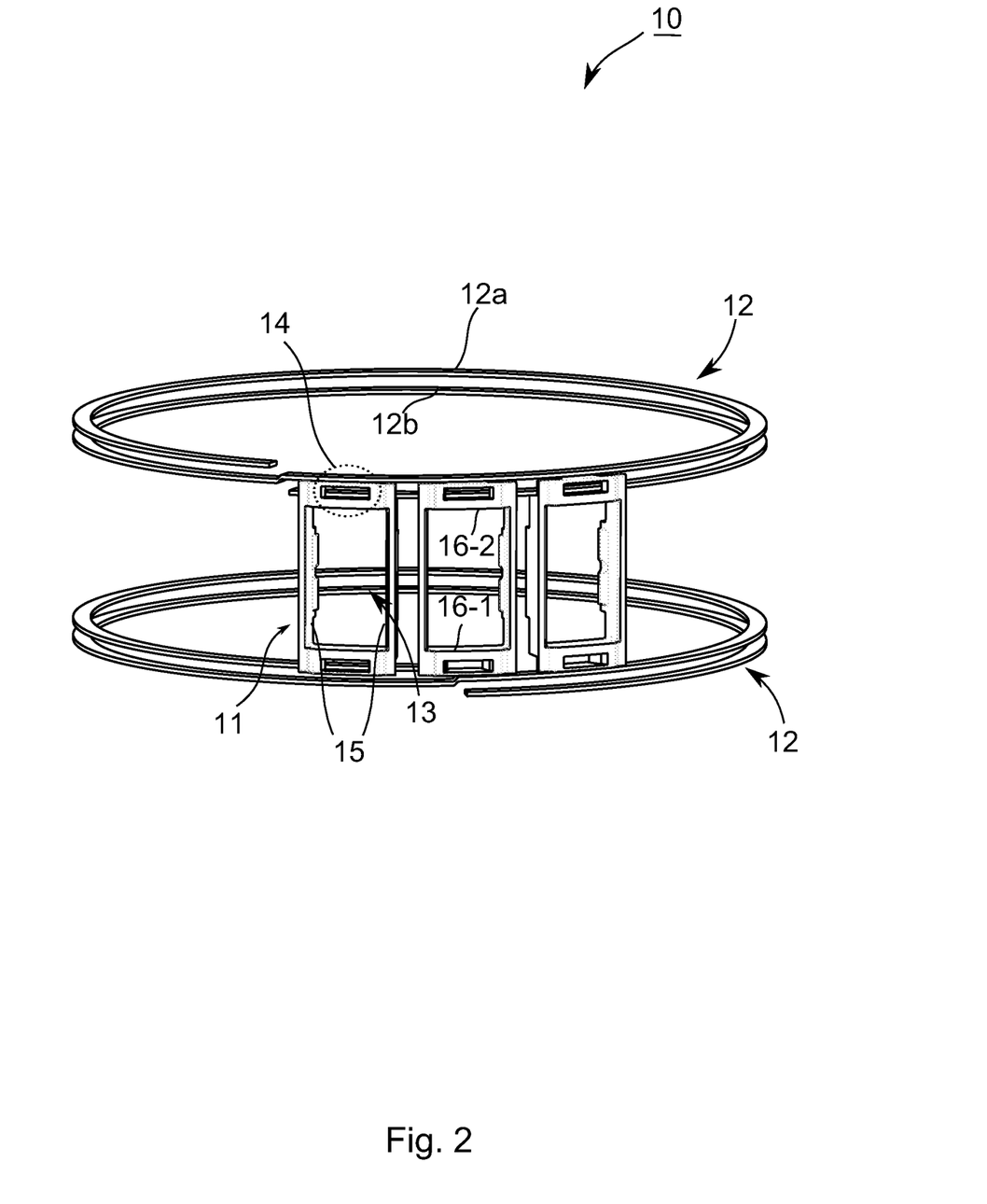
FIG. 2 shows an illustration for explaining a representative process for assembling individual cage segments onto one or two lamellar support rings, according to the exemplary embodiment.

In FIG. 1, two elastically-resilient, spiral-shaped lamellar rings 12 are shown, which are each formed from two (integrally connected) ring halves 12a and 12b that are disposed adjacently to one another as shown in FIG. 2. In order to ensure a planar arrangement of a double-wound lamellar ring 12, an angled bend 18 is provided in or at one section of the support ring 12. The respective terminal ends of the ring halves 12a and 12b terminate or end just before this angled bend 18, so that the terminal ends (joints) are disposed in an offset manner in the axial direction of the bearing cage 10. One terminal end of the double-winding, spiral-shaped lamellar ring 12 can now be inserted and pushed (spiraled) into the coupling device 14 of a bearing cage element 11 by slightly spreading (stretching or separating) it axially or radially relative to the rest of the lamellar ring 12 (e.g., relative to the angled bend 18), as will be described in more detail below with reference to FIG. 2.

Figures 3A, 3B:
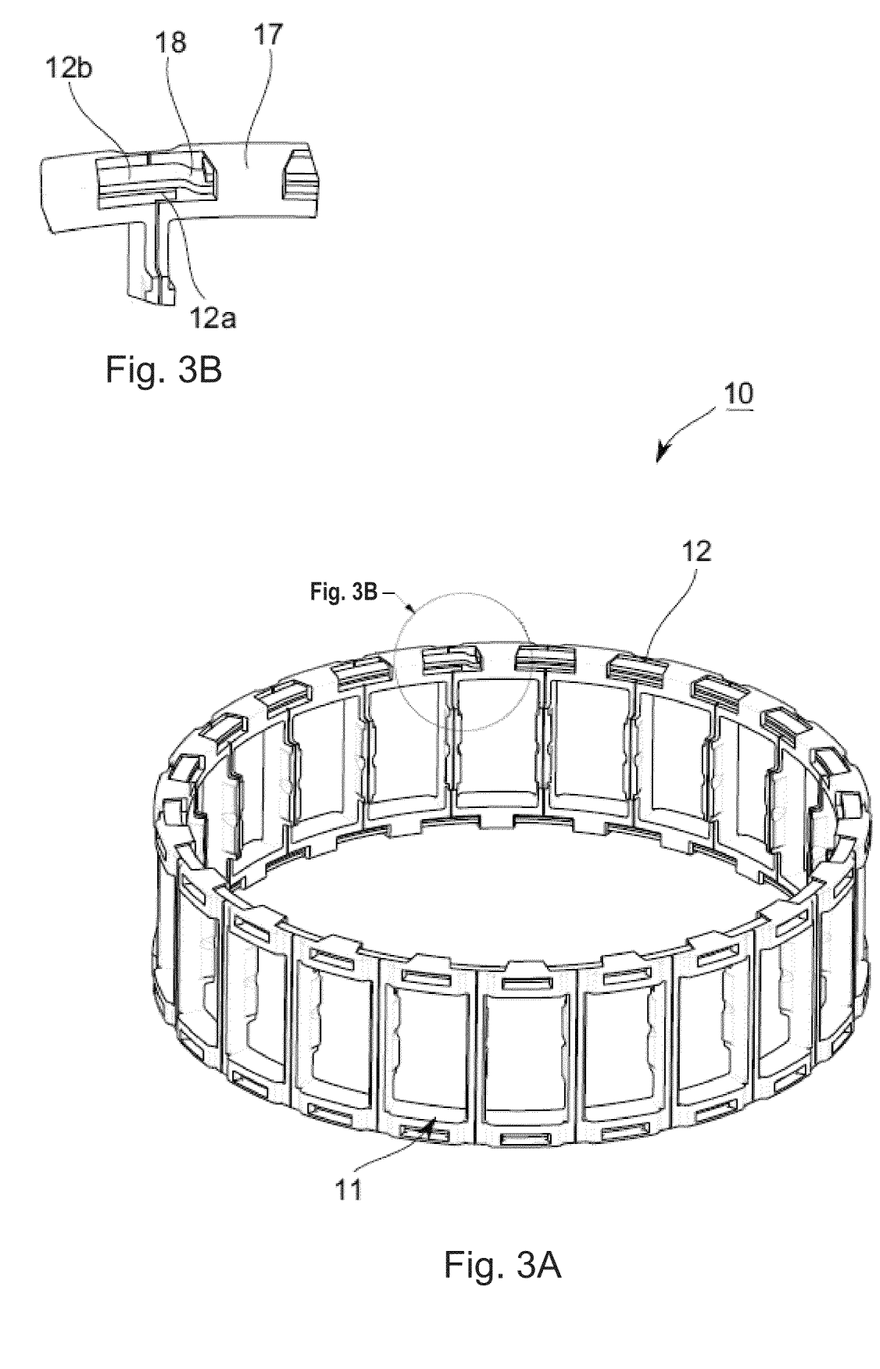
FIGS. 3A and 3B show a perspective illustration, and an enlarged, partial perspective illustration, respectively, of a fully assembled bearing cage having a plurality of separate cage segments, which are mounted onto two lamellar support rings, according to the exemplary embodiment.

Each support (lamellar) ring 12 can be formed advantageously from metal or carbon, so that a combined metal-polymer or carbon-polymer bearing cage results after the assembly of the bearing cage 10 (see FIG. 3A).

According to certain exemplary embodiments of the present teachings, the coupling device 14 of a bearing cage segment 11 comprises a (elastic) receptacle formed on or in at least one of the circumferential bridges 16-1, 16-2 and is designed to receive or accommodate at least one lamellar support ring 12 in an the interference-fit or interlocking manner. If the receptacle has a certain minimum elasticity, for example the usual elasticity of an injection-molded polymer, the lamellar support ring 12 can be made to connect the lamellar support ring 12 with the bearing cage segment 11 in an interference-fit manner.

According to the exemplary embodiment shown in FIG. 1, each circumferential bridge 16-1, 16-2 can include at least one axially-outward and circumferentially-oriented (circumferentially-pointing) conduit 17 for the accommodation or penetration (passing through) of a lamellar support ring 12. In the present specification, the term "circumferentially-oriented" means that the conduit 17 has a surface normal that is oriented (points) in the circumferential direction.

The elastic receptacle preferably has a curved opening or conduit 17 formed on or in the polymer of the bearing cage segment 11. The opening or conduit is elastic to a certain degree, and has an opening cross-section that is at least substantially matched to the cross-section of the lamellar support ring 12, which makes possible a loadable clamping connection between the ring 12 and the bearing cage segment 11.

The opening area of the elastic conduit 17 can, according to certain exemplary embodiments, be between 97% and 99% of the cross-sectional area of the two axially adjacent ring halves 12a, 12b of the lamellar ring 12. However, according to other, e.g. less elastic exemplary embodiments, the opening area of the conduit 17 can also be 100% or more of the cross-sectional area of the two axially or radially adjacent ring halves 12a, 12b of the lamellar ring 12, so that an especially smooth threading of the terminal end of the ring 12 into the conduit 17 is possible even with a less elastic conduit 17.

According to FIG. 1, an axially-outer-lying and circumferentially-extending (curved) conduit 17 is provided in each circumferential bridge 16-1, 16-2. The conduits 17 are formed or configured to accommodate or surround the lamellar support ring 12. Through the full-circumferential, interference-fit encircling of the lamellar support ring 12 by the conduits 17, an especially stable, stressable and captive coupling of polymer bearing cage segments 11 and lamellar support ring 12 can be achieved.

The conduits 17 for the at least one lamellar support ring 12 can, as shown in FIG. 1, be formed on the side of the circumferential bridge 16-1 that faces away from the axially opposing circumferential bridge 16-2, so that the conduits 17 formed on the opposing circumferential bridges 16-1, 16-2 lie on the sides of the axially opposing circumferential bridges 16-1, 16-2 that face away from each other in the axial direction. A lamellar support ring 12 made of carbon or metal is thus held on each axial end side of the thus-formed bearing cage 10.

According to other (not illustrated) exemplary embodiments, the conduits 17 for the at least one lamellar support ring 12 can also be formed on the side of the circumferential bridge 16-1 that is axially directed towards (faces) the circumferential bridge 16-2, so that the conduits 17 formed on the circumferential bridges 16 lie on the sides of the opposing circumferential bridges 16 that face towards one another in the axial direction of the bearing cage 10. In this case, the lamellar support ring 12 made of carbon or metal is not just held on one end side of the thus-formed bearing cage 10, but rather is held within an axial extension of the thus-formed bearing cage, which extension is defined by the spacing between the axially-opposing circumferential bridge sections. According to such a design, each bearing ring can be supported closer to the rolling elements, and is thus more dimensionally stable and generates less tilting moment. Because axially-inner conduits 17 do not extend axially outwardly, space can be saved in the axial direction, which in turn can lead to bearings that are thinner overall. This design is thus particularly advantageous for bearing applications in axially-restricted installation spaces.

As can be further seen from FIG. 1, each circumferential bridge 15 simultaneously functions as a separating bridge between two adjacent rolling element pockets or windows 13 and can also have guiding sections 19 configured to guide the rolling elements, such as e.g., cylindrical rollers, barrels or cones (tapered rollers). According to the exemplary embodiment shown in FIG. 1, the rolling element guiding sections 19 are embodied as guide flanges or lips formed on the connecting bridge 15 and have a shape adapted or matched to the curvature of the side surface of the rolling element. In general, the shape of the circumferentially-oriented sides of the connecting bridge 15 can be matched to the rolling element geometry, i.e. for example they can have a curvature corresponding to the rolling element surface. In the assembled state, this makes possible an improved and more stable guidance of the rolling elements. These thus-formed guide flanges or lips make it possible, for example with a cylindrical rolling bearing, to position the roller set captively in the cage, whereby a separate assembly of the individual bearing parts is possible without additional installation aids.

Exemplary embodiments of the present teachings also comprise a combined bearing cage for a ring-shaped (annular) rolling-element bearing, which has a plurality of bearing cage segments 11 disposed on at least one lamellar support ring 12; hereinafter, a method or a process for manufacturing or assembling such a bearing cage 10 will be explained.

As is indicated in FIG. 2, the assembly of a bearing cage 10 may first include providing at least one support ring 12 formed as a lamellar ring. More preferably, as shown in FIG. 2, two or more lamellar support rings 12 for the two axial ends of the bearing cage can also be provided.

Further, a plurality of bearing cage segments 11 are provided, each with two axially-spaced-apart and circumferentially-extending circumferential bridges 16-1, 16-2, and at least one connecting bridge 15 connecting the circumferential bridges 16-1, 16-2. In addition, each of the bearing cage segments 11 includes a coupling device 14 configured to retain the bearing cage segment 11 on the at least one support ring 12, so that at least one pocket 13 for accommodating a rolling element is formed by two bearing cage segments 11 that are disposed adjacently in the circumferential direction on the support ring 12.

In order to slide the bearing cage segments 11 onto the at least one lamellar support ring 12, each coupling device 14 has a circumferentially-oriented (curved) conduit 17 on each of the circumferential bridges 16-1, 16-2. The individual windings (ring halves) 12a, 12b of the lamellar ring 12 can be guided through the respective conduits 17 during the assembly process.

As illustrated in FIG. 2, this can be achieved by stretching, separating or spacing the ring halves 12a, 12b of one lamellar ring 12 apart from one another in the axial direction, so that one terminal end of one ring half 12a, 12b can be guided or "threaded" through the conduits 17 of the respective bearing cage segments 11 in a manner similar to the way that keys are threaded onto a key ring (i.e. by threading the terminal end of the key ring through the eye hole of the key). In other embodiments of the lamellar ring, the respective ring halves can also be stretched apart from one another in the radial direction.

During the assembly, the lamellar ring 12 can be "screwed onto" an already radially prepositioned and fixed cage segment 11. In an alternative thereto, the cage segments 11 can also be separately threaded onto the lamellar ring 12 so that, at the end of the assembly process, in each case an appropriately-manufactured or assembled metal- or carbon-polymer bearing ring results, as is shown in perspective in FIGS. 3A and 3B.

After the mounting of the bearing cage segments 11, the lamellar ring 12 can, according to some exemplary embodiments, be sealed, fused or bonded, in order to hold or retain the threaded-on bearing cage segments 11 in an especially captive manner. Such a sealing could be achieved for example through welding, soldering, etc. of the adjacently disposed ring halves 12a, 12b. For this purpose, the ring halves 12a, 12b could for example be point welded or soldered (e.g. at the joints), so that the ring halves 12a, 12b can no longer be readily stretched (separated or spaced) away from one another.

The bearing cage concept according to the present teachings is especially advantageous when used in bearings or bearing cages having a diameter of 300 mm or larger, since solid polymer cages, as was already described above, are achievable in these sizes only with significant difficulties. Thus, exemplary embodiments comprise combined metal- or carbon-polymer bearing cages having a diameter of 300 mm and over, especially of 350 mm and over.

In further exemplary embodiments of the present teachings, at least one support ring formed as a lamellar ring (lamellar support ring), but preferably two lamellar support rings, is held with an interference fit by the threading of the lamellar support ring through corresponding conduits in (prepositioned) polymer segments, or vice versa. Thus the individual polymer bearing cage segments are dimensionally stable relative to one another. The support rings can be metallic lamellar rings, such as for example steel lamellar rings, or carbon lamellar rings. Should there be a "weakening" of the metal- or carbon-polymer coupling points, a combined metal- or carbon-polymer bearing cage according to the present teachings nevertheless cannot fall apart. Due to the concept proposed herein, it is possible to provide raceway- or shoulder-guided metal- or carbon-polymer bearing cages.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing cages, roller bearings containing such bearing cages and methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Bearing cage
11 Bearing cage segment
12 Support ring formed as a lamellar ring (lamellar support ring)
12a First lamellar support ring half
12b Second lamellar support ring half
13 Rolling element pocket
14 Coupling device
15 Connecting bridge
16-1 Circumferential bridge
16-2 Circumferential bridge
17 Conduit
18 Angled bend
19 Guiding bridge for rolling elements

The invention claimed is:

1. A bearing cage for a rolling element bearing, comprising:
a plurality of individual bearing cage segments configured to respectively accommodate rolling elements in rolling element pockets formed by the bearing cage segments, each bearing cage segment including a first coupling device disposed on a first axial end thereof, wherein the first coupling devices each include a first conduit defined in the plurality of individual bearing cage segments such that a cross-section of at least a portion of the first conduit is enclosed in the plurality of individual bearing cage segments, and
a first lamellar support ring defining a first ring half extending continuously with a second ring half that are axially adjacent to each other and are biased towards each other, wherein the first ring half and the second ring half extend through the first conduit of each of the first coupling devices of the plurality of bearing cage segments,
wherein the first conduit is configured to receive the first lamellar support ring in an interference-fit manner.

2. The bearing cage according to claim 1, wherein each bearing cage segment further includes a second coupling device disposed on a second axial end thereof, and
the bearing cage further comprises:
a second lamellar support ring defining a first ring half extending continuously with a second ring half that are axially adjacent to each other and are biased towards each other, wherein the first and second ring halves of the second lamellar support ring extend through the respective second coupling devices of the plurality of bearing cage segments.

3. The bearing cage according to claim 2, wherein the first and second lamellar support rings are each formed as a double-winding, spiral-shaped ring, the two windings corresponding to the first and second ring halves.

4. The bearing cage according to claim 3, wherein terminal ends of the first and second lamellar support rings are offset in the axial direction relative to each another by an axial or radial angled bend formed in a circumferential direction of the bearing cage.

5. The bearing cage according to claim 4, wherein:
   each of the second coupling devices comprises a second conduit configured to receive the second lamellar support ring, and
   the first and second conduits are disposed on axially-opposite ends of the bearing cage segments.

6. The bearing cage according to claim 5, wherein an opening cross-section of each of the first and second conduits at least substantially corresponds to a cross-section of the respective lamellar support rings.

7. The bearing cage according to claim 6, wherein each bearing cage segment is at least substantially comprised of a polymer and each lamellar support ring is at least substantially comprised of metal or carbon.

8. The bearing cage according to claim 1, wherein the first lamellar support ring is formed as a double-winding, spiral-shaped ring, the two windings corresponding to the first and second ring halves.

9. The bearing cage according to claim 1, wherein terminal ends of the first lamellar support ring are offset in the axial direction relative to each another by an axial or radial angled bend formed in a circumferential direction of the bearing cage.

10. The bearing cage according to claim 1, wherein an opening cross-section of each first conduit at least substantially corresponds to a cross-section of the first lamellar support ring.

11. The bearing cage according to claim 1, wherein the first conduit is curved to follow the circumferential direction and has openings on opposite circumferential ends of the conduit.

12. The bearing cage according to claim 1, wherein each bearing cage segment is at least substantially comprised of a polymer and each lamellar support ring is at least substantially comprised of metal or carbon.

13. A bearing cage segment for a rolling-element bearing cage, comprising
   two circumferential bridges extending in a circumferential direction,
   at least one connecting bridge connecting the circumferential bridges in an axial direction, and
   at least one coupling device disposed in or on at least one of the two circumferential bridges, the at least one coupling device being configured to engage the bearing cage segment with at least one lamellar support ring having two adjacently-abutting and axially- or radially-biased ring halves, such that a pocket for accommodating a rolling element is formable by two bearing cage segments adjacently disposed on the at least one lamellar support ring in the circumferential direction, wherein the at least one coupling device includes a conduit defined in the bearing cage segment such that a cross-section of at least a portion of the conduit is enclosed in the bearing cage segments,
   wherein the conduit is configured to receive the at least one lamellar support ring in an interference-fit manner.

14. The bearing cage segment according to claim 13, wherein the conduit is curved to follow the circumferential direction and has openings on opposite circumferential ends of the conduit.

15. The bearing cage segment according to claim 13, wherein the conduit defines a radial dimension in cross-section having a length of between 97% and 99% of a radial dimension of a combination of the first and second ring halves, such that the conduit is elastically deformed when the first and second ring halves are received therein, so as to form an interference fit therewith.

16. A method for manufacturing a bearing cage for a rolling element, comprising:
   providing at least one support ring formed as a lamellar ring and having two adjacently-abutting and axially- or radially-biased ring halves;
   providing a plurality of individual bearing cage segments for accommodating respective rolling elements in rolling element pockets formed by the bearing cage segments, wherein each of the bearing cage segments includes a coupling device configured to attach the bearing cage segments onto the at least one lamellar support ring, the coupling device including a conduit defined in the plurality of individual bearing cage segments such that a cross-section of at least a portion of the conduit is enclosed in the respective plurality of individual bearing cage segments; and
   disposing the plurality of bearing cage segments on the at least one lamellar support ring by receiving the at least one lamellar support ring through the conduit of each of the plurality of bearing cage segments, such that at least one pocket for accommodating a rolling bearing is formed by each two adjacently-disposed bearing cage segments,
   wherein receiving the at least one lamellar support ring through the conduit of each of the plurality of bearing cage segments comprises elastically expanding an open cross-section of the conduit of each of the plurality of bearing segments so as to form an interference fit between the at least one lamellar support ring and the plurality of bearing cage segments.

17. The method according to claim 16, wherein the disposing step comprises:
   threading a first ring half of the at least one lamellar support ring through the respective coupling devices of the plurality of bearing cage segments; and
   after threading the first ring half, threading the second ring half of the at least one lamellar support ring through the respective coupling devices of the plurality of bearing cage segments.

18. The method according to claim 17, wherein:
   threading the first ring half comprises receiving the first ring half circumferentially through the conduit of the coupling device of each of the plurality of bearing cage segments; and
   threading the second ring half comprises receiving the second ring half circumferentially through the conduit of the coupling device of each of the plurality of bearing cage segments.

* * * * *